United States Patent
Watanabe et al.

(10) Patent No.: US 7,424,341 B2
(45) Date of Patent: Sep. 9, 2008

(54) ROBOT SYSTEM

(75) Inventors: Atsushi Watanabe, Tokyo (JP); Jun Mizuno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 814 days.

(21) Appl. No.: 10/853,169

(22) Filed: May 26, 2004

(65) Prior Publication Data
US 2004/0243282 A1 Dec. 2, 2004

(30) Foreign Application Priority Data
May 29, 2003 (JP) ............................. 2003-152845

(51) Int. Cl.
*G06F 19/00* (2006.01)

(52) U.S. Cl. ................. 700/245; 700/245; 700/247; 700/248; 700/250; 700/251; 700/252; 700/253; 700/255; 700/257; 700/259; 700/261; 700/262; 700/264; 318/568.1; 318/568.11; 318/568.14; 318/568.16; 318/568.21; 901/4; 901/43; 901/47

(58) Field of Classification Search ............. 318/568.1, 318/568.11, 568.14, 568.16, 568.21, 568.23; 901/4, 43, 47
See application file for complete search history.

(56) References Cited

U.S. PATENT DOCUMENTS

| | | | | |
|---|---|---|---|---|
| 3,804,270 A | * | 4/1974 | Michaud et al. ............. | 414/267 |
| 4,402,053 A | * | 8/1983 | Kelley et al. ................ | 700/259 |
| 4,869,813 A | * | 9/1989 | Bailey et al. ................ | 209/538 |
| 6,763,282 B2 | * | 7/2004 | Glenn et al. ................ | 700/245 |
| 6,879,878 B2 | * | 4/2005 | Glenn et al. ................ | 700/245 |
| 7,069,111 B2 | * | 6/2006 | Glenn et al. ................ | 700/245 |
| 7,262,573 B2 | * | 8/2007 | Wang et al. ............ | 318/568.12 |

FOREIGN PATENT DOCUMENTS

| | | |
|---|---|---|
| CN | 1243690 | 2/2000 |
| JP | 03-117582 | 4/1991 |
| JP | 08-0001563 | 9/1996 |
| JP | 10-049218 | 2/1998 |

OTHER PUBLICATIONS

Chinese Office Action dated May 12, 2006 of Application No. 2004100421394.3.

(Continued)

*Primary Examiner*—Khoi H. Tran
*Assistant Examiner*—McDieunel Marc
(74) *Attorney, Agent, or Firm*—Staas & Halsey LLP

(57) ABSTRACT

A robot system efficiently performing an operation of moving a robot to close to and/or separate from a target point, such as teaching operation. A camera of a visual sensor is mounted to the robot such that a distal end of an end effector is seen within the field of view of the camera, and the end effector's distal end and a target position on an object are specified on a monitor screen. When an approach key is depressed, a target position is detected on an image, and a difference from a position of the end effector's distal end is calculated. Whether the difference is within an allowable range is checked. Depending on the result, an amount of robot motion is calculated, and the robot is operated. The processing is repeated until the depressed approach key is released. When a retreat key is depressed, the robot moves away from the object. The robot may be caused to stop using a distance sensor.

18 Claims, 6 Drawing Sheets

OTHER PUBLICATIONS

Japanese Office Action issued in priority Japanese Application No. 2003-152845 presents rejections based on JP03-117582U and JP08-001536A in form PTO-1449.

Japanese Office Action issued in priority Japanese Application No. 2003-152845 presents rejections based on JP03-117582U (Reference: AG) and JP08-001536A (Reference 300) in form PTO-1449.

* cited by examiner

ROBOT SYSTEM

BACKGROUND OF THE INVENTION

1. Field of the Invention

This invention relates to a robot system for moving a robot utilizing a visual sensor, and more particularly, to a robot system capable of automatically making a predetermined part of an object and a predetermined part of an end effector attached to a robot approach and separate from each other, with the predetermined parts seen within the field of view of a visual sensor.

2. Description of Related Art

In an ordinary robot teaching operation, an operator pushes a key on a teaching pendant to manually move the robot (so-called jog feed), so that a distal end of an end effector attached to the robot is moved to a teaching position on a workpiece, and the robot (robot controller) is caused to store a robot position that is assumed when the teaching position is reached. During the teaching operation, the operator must always keep a coordinate system in mind that serves as a reference for robot operation (hereinafter referred to as robot coordinate system).

To move the end effector close to the teaching position, the operator should first consider which of the X, Y and Z directions in the robot coordinate system is directed close to the workpiece. However, the direction directed toward the teaching position does not necessarily coincide with the X, Y or Z direction in the robot coordinate system. Thus, the operator is generally required to repeat an operation of moving the end effector by an appropriate short distance in the X, Y and Z directions a number of times until the distal end of the end effector reaches the teaching position.

When moving the end effector separate from the workpiece, the operator is also required to keep the robot coordinate system in mind because the end effector can move close to and collide with the workpiece, if the operator misunderstands the directions of the robot coordinate axes and operates a wrong key different from the key to be used to move the end effector separate from the workpiece.

As a prior art document relating to this invention, there may be mentioned JP-A-10-49218 for example. This publication discloses technical art for moving a robot tool end to a teaching position utilizing a visual sensor, but fails to disclose the below-mentioned features of this invention.

As explained above, the operator needs to try and error to perform the robot teaching operation which is therefore extremely cumbersome and puts an enormous load on the operator. Such teaching operation can only be performed by skilled personnel in a short time.

SUMMARY OF THE INVENTION

The present invention provides a technical art capable of efficiently carrying out a robot motion, such as in a teaching operation, for moving a predetermined part of an end effector close to or separate from a predetermined part of an object, without putting a heavy load on an operator.

According to the present invention, image capturing means (generally, a camera) of a visual sensor is set up such that a predetermined part of an end effector (typically, a distal end of the end effector) of a robot is seen within the field of view of the image capturing means, and a robot system is designed to have a control function to cause the predetermined part of the end effector to move close to or to overlap a predetermined part (typically, a portion to be taught) of an object in an image that is captured by the image capturing means. Alternatively, the robot system is arranged to have not only the just-mentioned control function but also a control function to move, in the image, the predetermined part of the end effector separate from the predetermined part of the object.

These fictions eliminate the need for the operator to keep the robot coordinate system in mind. With these functions, there can be for example constructed a system with which the operator can move the end effector close to a teaching position simply by depressing a key. Also when moving the end effector away from the teaching position, the operator only requires to depress a key. This makes it possible to shorten the required time for teaching operation and simplify the teaching operation. Also, the possibility of a mistaken teaching operation by which the end effector is brought in contact with the workpiece, jig, peripheral equipment, or the like can be reduced.

According to a first aspect of the present invention, the robot system comprises: a robot with an end effector mounted thereon; a visual sensor having image capturing means for capturing an image including a first point set with respect to the end effector and a second point set with respect to an object; approach commanding means for issuing an approach command for operating the robot such that the first point approaches the second point in three dimensional space in response to input of an approach instruction; means for recognizing positions of the first and second points in the image captured by the visual sensor with the first and second points being within a field of view of the image capturing means to obtain a positional relation between the first point and the second point in the image; means for calculating a first motion command for operating the robot such that the first point and the second point approaches each other in the captured image based on the positional relation between the first point and the second point in the image; means for calculating a second motion command for operating the robot such that the first point approaches the second point in the three dimensional space in response to the approach command; means for obtaining a first combined motion command by combining the first motion command and the second motion command, to operate the robot according to the first combined motion command; and means for repeating the recognition of the positional relation between the first point and the second point, the calculations of the first motion command and the second motion command and the robot operation according to the first combined motion command while the approach instruction is inputted to the approach commanding means.

The first point may be set by designating a picture element in the captured image irrespective of whether the end effector is within the field of view of the image capturing means, and the robot system may comprise means for making the image capturing means approach a position of the second point the object as the first point and the second point approach each other in the captured image.

The robot system may further comprise: means for operating the robot according to the first motion command; means for determining whether or not the positional relation between the first point and the second point in the captured image fulfills a predetermined condition; and means for repeating the recognition of the positional relation between the first point and the second point, the determination by the determination means, the calculation of the first motion command, and the operation of the robot according to the first motion command until the determination means determines that the predetermined condition is fulfilled, in response to the input of the approach instruction to the approach commanding means, before repeating the operation of the robot according to the first combined motion command.

In this case, the robot system may further comprise means for repeating the operation of the robot according to the second motion command after repeating the operation of the robot according to the first combined motion command.

The means for calculating the second motion command may calculate motion information for moving the end effector in a direction along an optical axis of the image capturing means, or in a direction along a line of sight connecting the image capturing means and the second point.

The robot system may further comprise: a distance sensor or a contact sensor mounted on the robot; and means for stopping the robot when the distance sensor or the contact sensor detects that the first point approaches the second point within a predetermined distance while the approach instruction is inputted to the approach commanding means. In this case, a position at which the robot stops may be stored as a taught position.

The robot system may further comprise: retreat commanding means for issuing a retreat command for operating the robot such that the first point moves remote from the second point in three dimensional space in response to input of a retreat instruction; means for calculating a third motion command to operate the robot such that the first point moves remote from the second point in three dimensional space in response to the retreat command; means for obtaining a second combined motion command by combining the first motion command and the third motion command, to operate the robot according to the second combined motion command; and means for repeating the recognition of the positional relation between the first point and the second point, the calculations of the first and third motion commands, and the operation of the robot according to the second combined motion command while the retreat instruction is inputted to the retreat commanding means.

In this case, the robot system may further comprise: means for operating the robot according to the first motion command; determination means for determining whether or not the positional relation between the first point and the second point in the captured image fulfills a predetermined condition; and means for repeating the recognition of the positional relation between the first point and the second point, the determination by the determination means, the calculation of the first motion command and the operation of the robot according to the first motion command until the determination means determines that the predetermined condition is fulfilled, in response to the input of the retreat instruction to the retreat commanding means before repeating the operation of the robot according to the second combined motion command. Furthermore, the robot system may comprise means for repeating an operation of the robot according to the third motion command after the operation of the robot according to the second combined motion command.

The means for calculating the third motion command may calculate motion information for moving the end effector in a direction along an optical axis of the image capturing means, or in a direction along a line of sight connecting the image capturing means and the second point.

According to a second aspect of the present invention, the robot system comprises: a robot with an end effector mounted thereon; a visual sensor having image capturing means for capturing an image including a first point set with respect to the end effector and a second point set with respect to an object; visually two-dimensional approach commanding means for issuing a visually two-dimensional approach command for operating the robot such that the first point and the second point approach each other two-dimensionally in the captured image in response to input of a visually two-dimensional approach instruction; means for recognizing positions of the first point and the second point in the image captured by the visual sensor with the first and second points being within a field of view of the image capturing means to obtain a positional relation between the first point and the second point in the image; means for calculating a motion command for operating the robot such that the first point and the second point approach each other in the captured image based on the positional relation between the first point and the second point; means for operating the robot according to the calculated motion command; and means for repeating the recognition of the positional relation between the first point and the second point, the calculation of the motion command, and the operation of the robot according to the obtained motion command while the visually two-dimensional approach instruction is inputted to the visually two-dimensional approach commanding means.

According to a third aspect of the present invention, the robot system comprises: a robot with an end effector mounted thereon; a visual sensor having image capturing means for capturing an image including a first point set with respect to the end effector and a second point set with respect to an object; visually two-dimensional approach commanding means for issuing a visually two-dimensional approach command for operating the robot such that the first point and the second point approach each other two-dimensionally in the captured image in response to input of a visually two-dimensional approach instruction; means for specifying a direction of visually two-dimensional motion of the first point in the image captured by the visual sensor with the first point and the second point within a field of view of the image capturing means; calculation means for calculating a motion command for operating the robot such that the first point moves in the specified direction; and means for operating the robot according to the calculated motion command.

According to a third aspect of the present invention, the robot system comprises: a robot with image capturing means mounted thereon; means for specifying a direction of visually two-dimensional motion of a point set with respect to an object, in an image including the point captured by the image capturing means within a field of view thereof; means for calculating a motion command for operating the robot such that the point moves in the specified direction in the captured image; and means for operating the robot according to the calculated motion command.

According to a fourth aspect of the present invention, the robot system comprises: a robot with image capturing means mounted thereon; means for specifying a direction of visually two-dimensional motion of an image captured by the image capturing means; calculation means for calculating a motion command for operating the robot such that the captured image moves in the specified direction; and means for operating the robot according to the calculated motion command.

The operation of the robot according to the motion command may be performed on the basis of a predetermined coordinate system. The predetermined coordinate system may be a coordinate system set to the image capturing means.

The robot system may further comprise display means for displaying the image captured by the image capturing means of the visual sensor, and a line segment connecting the first part and the second part may be displayed on the captured image by the display means.

From the principle viewpoint, the image capturing means is not required to be mounted on the robot. However, in practice, it is preferable that the image capturing means be mounted on the robot to ensure that the end effector is always seen within the field of view, and that the detection accuracy of the visual sensor at the time when the end effector approaches the object is improved.

DETAILED DESCRIPTION

Figure 1:
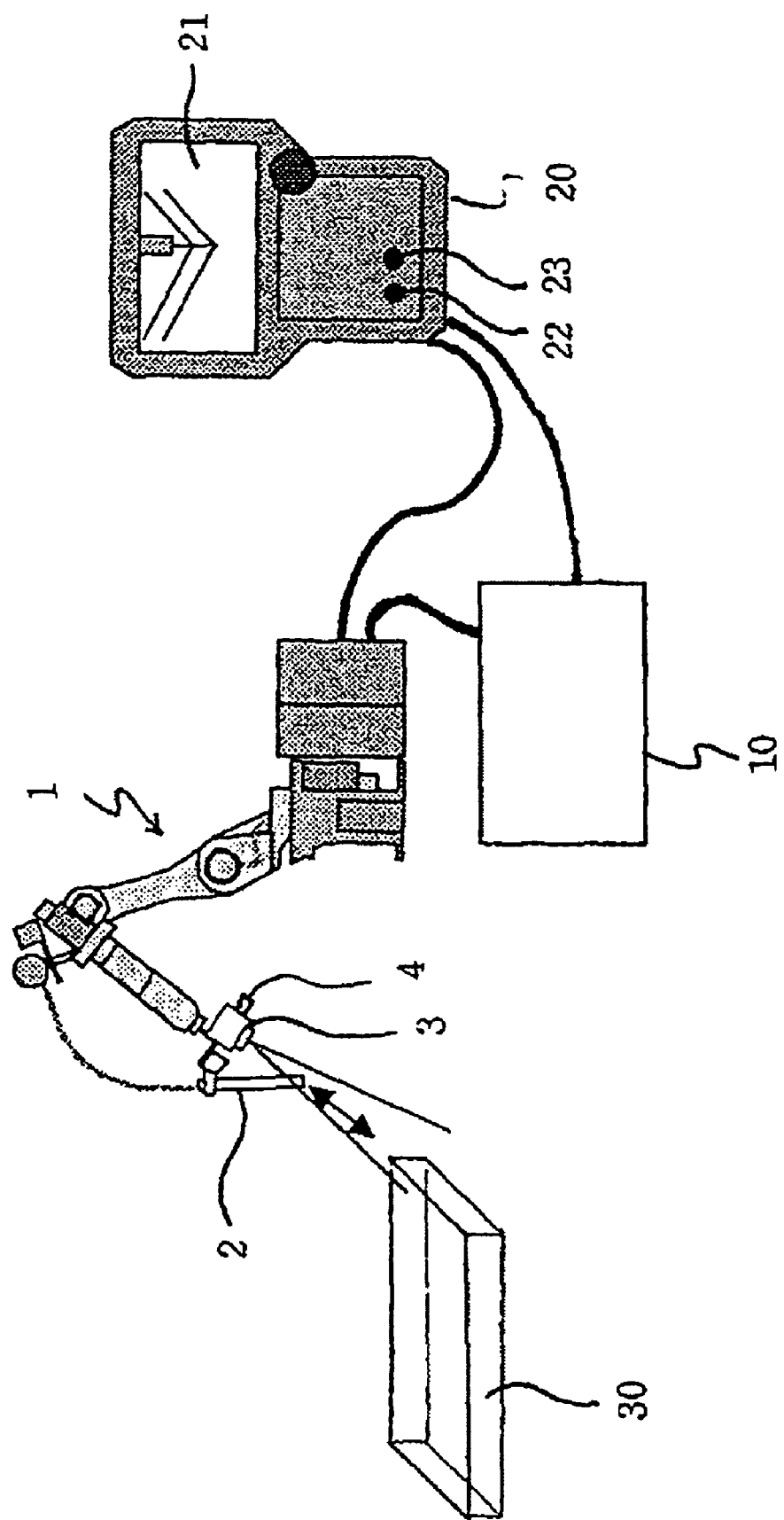
FIG. 1 is a view for explaining the overall arrangement of a robot system according to an embodiment of this invention.

FIG. 1 shows the overall arrangement of a robot system according to one embodiment of this invention. As shown in FIG. 1, a robot's main mechanism section 1 (hereinafter referred to as robot) connected to a robot controller 10 is comprised of a 6-axis arc welding robot provided with a robot arm having a distal end thereof to which is attached an arc welding torch 2 serving as end effector. A CCD camera (CCD digital video camera, for instance) 3 serving as image capturing means of a visual sensor is attached to the vicinity (J6 flange) of the arc welding torch 2.

Mounted near the camera 3 is a distance sensor 4 that is connected to the robot controller 10. In a state where the field of view of the camera 3 is directed to an object (for instance, a component part (ditto in the following)) 30, a distance between the distance sensor 4 and the object 30 is always measured, and a distance sensor signal is supplied to the robot controller 10. Instead of the distance sensor 4, a contact sensor may be mounted for always detecting the presence/absence of contact, so that a signal indicative of the presence/absence of contact is supplied to the robot controller 10. In that case, a probe of the contact sensor is set up such that a contact signal is supplied from the contact sensor to the robot controller 10 nearly simultaneously when the distal end of the end effector 2 is brought in contact with the object 30.

The camera 3 is connected to a teaching pendant 20 which is in turn connected to the robot controller 10. The teaching pendant 20 not only has its original functions (for manual robot operation, teaching data storage, teaching data edition, etc.) but also serves as image processing and image display sections of the visual sensor. Reference numeral 21 denotes a display screen of the image display section. A display screen with a touch panel is used here, in which a point designation can be made on the screen 21. Instead of using such touch panel, the point designation may be made using cursor display and key operation. In either case, an operator can specify (pointing) an arbitrary point on the screen 21.

In relation to features of this invention, a group of operation keys (not shown in entirety) of the teaching pendant includes an approach key (approach operation command inputting means) 22 and a retreat key (separation command inputting means) 23. The image processing section in the teaching pendant 20 includes a camera interface, CPU, image memory, data memory, etc., and is installed with software for implementing the below-mentioned image processing.

Contents of processing performed by the image processing section as well as functions and usage of the approach and retreat keys 22, 23 will be explained later. The robot controller 10 is a conventional one that comprises a CPU, memory, teaching-pendant interface, etc. and is designed to perform software processing to achieve not only ordinary functions (for program reproducing operation and for manual operation based on commands supplied from the teaching pendant 20) but also motion control functions achieved in the later-mentioned forms in association with operations of the approach key 22, retreat key 23, and the like.

One important point in applying this invention is a requirement of how the field of view of the camera 3 is set up. Specifically, the mounting position and orientation of the camera 3 are determined such that a predetermined part (first part) of the end effector (arc welding torch) 2 is seen within the field of view of the camera 3. Ordinarily, a tool end point serves as the predetermined part of the end effector 2. In this example, a distal end of a wire projecting from the torch serves as the predetermined part (first part).

Meanwhile, there is a case where the end effector 2 is not seen within the field of view of the camera 3 such as for example that one point in space which is spaced apart from the end effector 2 by some distance in a certain. direction is set as the tool end point which represent the end effector. Even in this case, such point in space can be regarded as constituting the predetermined part (first part) of the end effector 2. In that case, although the end effector 2 per se is not placed within the field of view of the camera 8, the predetermined part (first part) of the end effector 2 can be considered as being placed within the field of view. For a robot provided with no end effector 2, therefore, a given point in space can be regarded as the tool end point and considered as the first part. Such case will be hereinafter referred to as "case where the tool end point is at one point in space."

Further, the camera 3 used here should have the field of view wide enough that a predetermined part (second part) of the object 30 is also placed within the field of view with adjustment of robot's position and orientation, so that an image of the object 30 is formed on the screen 21, while preventing the screen 21 from being occupied only by the image of the welding torch 2. The predetermined part (second part) of the object 30 ordinarily corresponds to a "teaching portion (that is a portion desired to be taught as teaching point)." In this example, as described later, a teaching portion 7 (refer to FIG. 2) on the object 30 is specified on the screen 21 as the predetermined part (second part) of the object.

With the above described arrangement and functions of the system in mind, the following are explanations on procedures, including preparatory work, for causing the wire end of the welding torch 2 (that serves as the first part which is the predetermined part of the end effector) to approach and separate from the teaching portion of the object 30 (that serves as the second part which is the predetermined part of the object).

Figure 2:
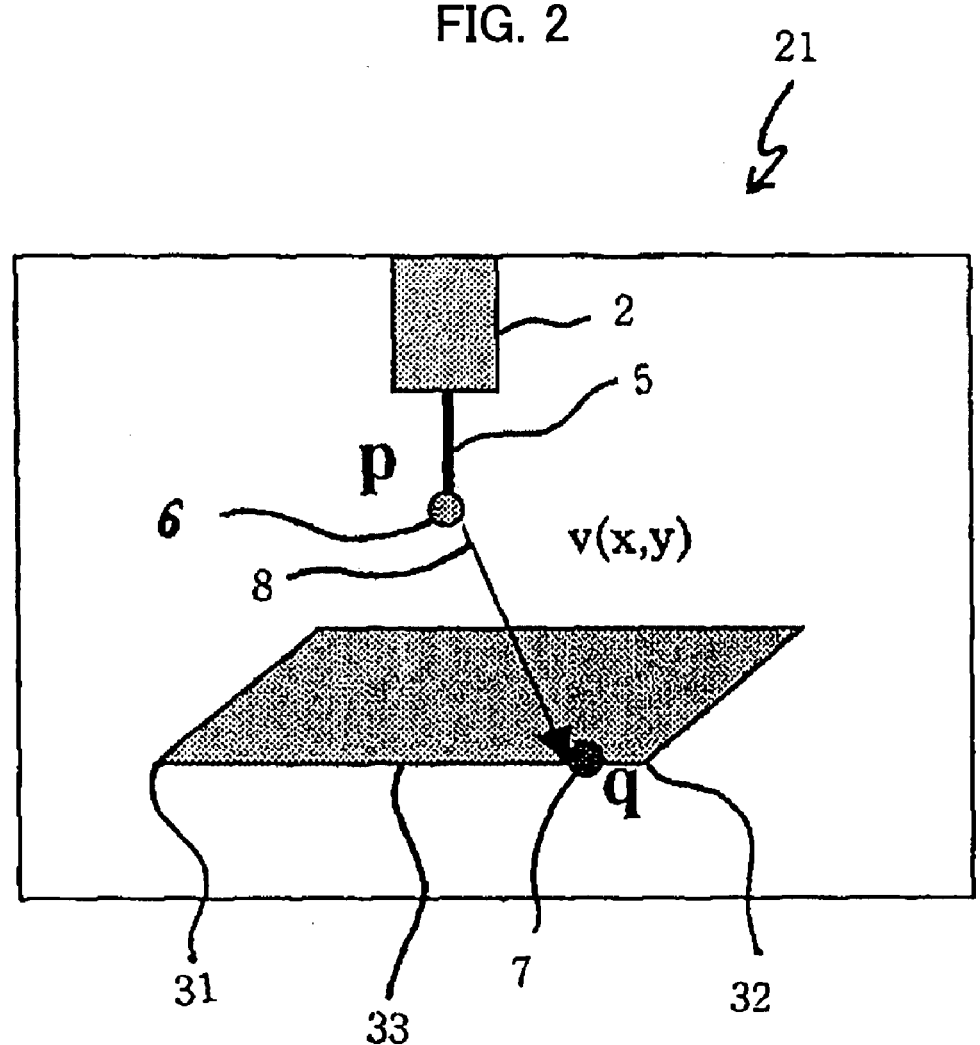
FIG. 2 is a view for explaining an image displayed on a display screen and for explaining how a first part (predetermined part of an end effector) and a second part (predetermined part of an object) are specified.

For the preparatory work, an operator specifies the predetermined part (first part) of the end effector on the display screen 21. As previously described, the wire end is specified here using the touch panel function. As shown in FIG. 2, a coordinate value (two dimension) of the end 6 of the wire 5 on the screen 21 is represented by p(x, y). The value of p(x, y) is a value on a visual sensor coordinate system that is set on the visual sensor, and is stored into the memory of the teaching pendant 20. Instead of the touch panel function, cursor display and key operation may be used where appropriate. For the determination of p(x, y), the end 6 of the wire 5 may be detected by image detection processing of the visual sensor, instead of the point designation by the operator.

Also in the aforementioned case where the tool end point corresponds to one point in space, one or more picture elements by which such point is displayed may be specified on the screen 21. The picture elements are equivalent to the position of the first part on the image, and may be used as the coordinate value p(x, y).

Next, the operator carries out a manual operation (jog operation) using the teaching pendant 20 to thereby operate the robot 1 such that the entire of the workpiece 30 is seen in the image. Watching the image displayed on the screen 21 of the teaching pendant 20, the operator specifies a portion (hereinafter referred to as target point) 7 to which the operator wishes to move the robot 1. As illustrated in FIG. 2, the position of the target point 7 (coordinate value on the screen 21) is represented by q. (To be noted, the value of q varies as the robot 1 moves.)

As mentioned above, the target point 7 here specified as the predetermined part (second part) of the workpiece (object) 30 typically corresponds to the teaching portion. In general, however, the target point 7 may not correspond to the teaching portion. To specify the second part, the touch panel or the cursor may be used as explained above. Alternatively may be specified a part detected by the image detection processing. Data representing the specified point is stored such that the visual sensor can subsequently recognize the specified point 7 on the Workpiece 30. For instance, an interior division ratio r on a line segment 33 (between points 31 and 32), passing through the target point and constituting a characterized portion of the workpiece 30, may be stored. By doing this, the position of the target point 7 (on the visual sensor coordinate system) can subsequently be determined as long as the line segment 33 can be detected, even if the robot moves.

When the target point 7 is determined in this manner, a circle for instance is drawn around the target point 7 on the screen 21, whereby the position of the target point 7 is clearly shown on the screen 21. At this time, a line segment (with arrow, where desired) 8 passing the distal end 6 of the wire 5 and the target point 7 may be displayed on the screen 21 to provide a visual indication of the direction of motion to be subsequently made.

When an approach operation key is depressed by the operator after the preparatory work is completed, the robot 1 starts its motion to cause the distal end (first part) 6 of the wire 5 to approach the target point (second part) 7. This operation is controlled by procedures shown in the flowchart of FIG. 3. The following are main points of respective steps.

Step S1: The visual sensor detects a target position (a coordinate value q of the target point 7) on the image. As explained above, the target position is determined from the coordinate values of points 31, 32 on the image and the interior division ratio r. Alternatively, the visual sensor may detect the target point 7, if the sensor can recognize the target point 7 per se as a characterized point (e.g., a black point, a small hole, or the like).

Step S2: A difference between the target position and a distal end position of the end effector on the image is calculated in accordance with formula shown by (A) in FIG. 3, to determine a vector v(x, y) connecting the coordinate value q of the target point on the image and the coordinate value p of the distal end 6 of the wire 5 on the image.

Step S3: To prepare a motion command, an amount of robot motion is calculated as described below. Formulae used for the calculation are shown in Steps G1, G2, and G3 in (B) of FIG. 3.

At first, by means of coordinate transformation, the vector v(x, y) determined at Step S2 is transformed into a vector V(x, y, z) represented by a robot flange coordinate system (Step G1). At this time, since the image only offers two dimensional information, the vector V(x, y, z) is represented by v(x, y, 0) lying in a plane perpendicular to the optical axis of the visual sensor. The coordinate transformation is performed to a vector v'(x, y, 0) obtained by three dimensionally extending the vector v(x, y), rather than to the vector v(x, y).

For the coordinate transformation, a transformation matrix T is used that represents a relation of transformation between the visual sensor coordinate system (screen coordinate system) and the robot flange coordinate system. It is assumed here that the transformation matrix T is determined in advance by means of a known calibration. Meanwhile, it is unnecessary to strictly determine the transformation matrix T. This matrix is only required to correlate the X and Y directions of the robot flange coordinate system to the X and Y directions of the visual sensor coordinate system (screen coordinate system).

Then, a vector V'(x, y, z) is obtained by adding a vector (0, 0, c), extending toward the optical axis of the visual sensor and having a certain magnitude of c, to the vector V(x, y, 0) obtained by the coordinate transformation (Step G2). The magnitude c corresponds to an incremental approach amount of an optical axis component for a stepwise approach operation, and is set to an appropriate small value (1 mm, for instance).

Figure 3:
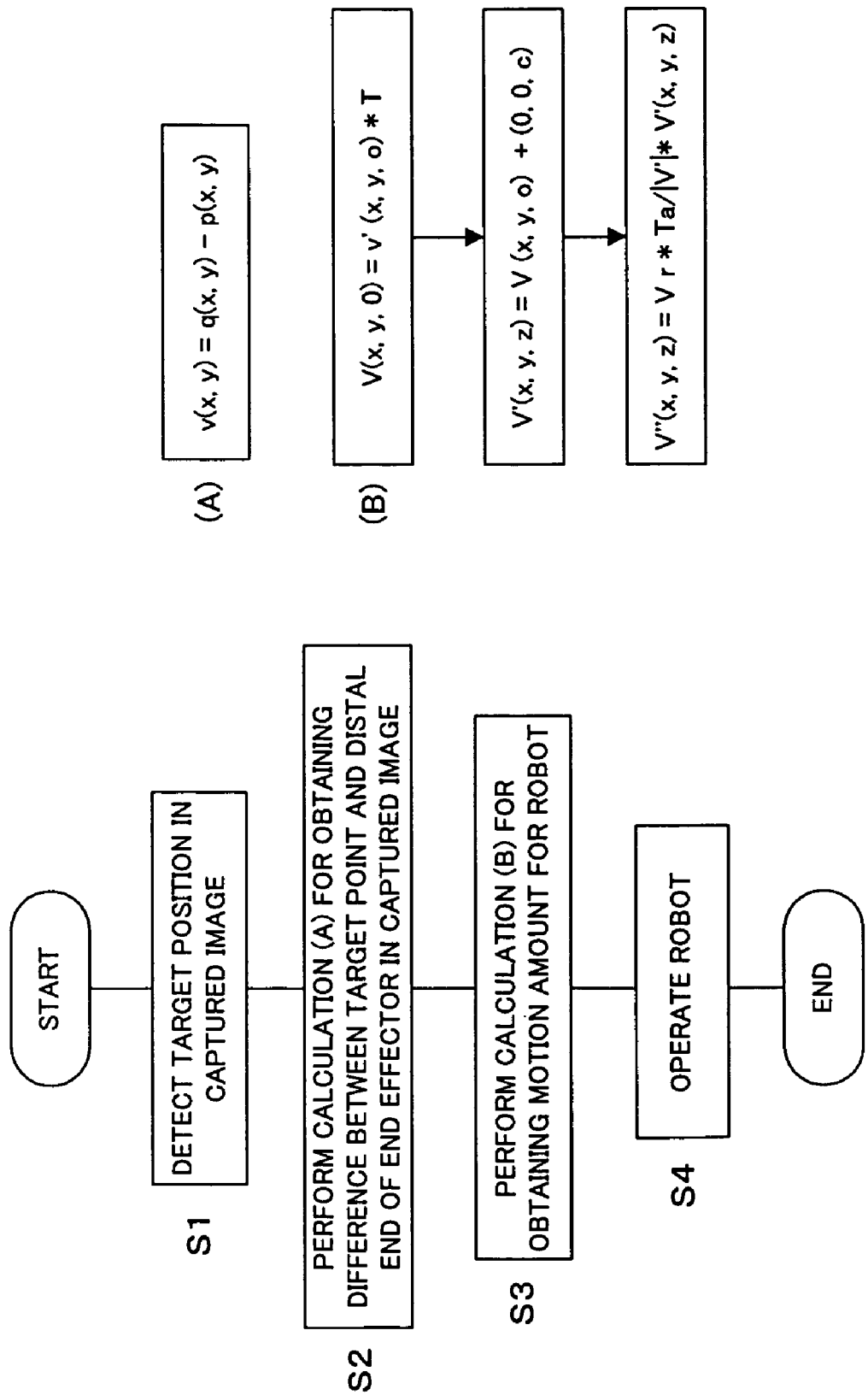
FIG. 3 is a flowchart for explaining the outline of an example of a control for approach operation.

From the vector V'(x, y, z) and a robot velocity Vr currently specified by the teaching pendant 20, a vector V"(x, y, z) whose magnitude corresponds to a distance for which the robot can move in a period Ta is determined according to formula shown in (B) of FIG. 3 (Step G3).

If the calculated distance between the target point 7 and the distal end 6 of the wire 5 on the image is large, the vector V" indicates a large amount of motion in the plane perpendicular to the optical axis of the visual sensor. On the other hand, if the points 6, 7 are close to each other, the vector V" indicates a large amount of motion in the direction parallel to the optical axis of the visual sensor.

Step S4: A motion command for moving the robot from its current position by an amount (three dimensional vector quantity) represented by the vector V"(x, y, z) is prepared, and respective axis servomotors are controlled to move the robot. When the robot completes its one period motion, the flow returns to Step S1 to repeat the aforesaid control. The image displayed on the screen 21 is renewed at intervals of the motion cycle. Therefore, after the start of the robot motion, the target point 7 moves in the image, whereas the distal end point 6 of the end effector is kept immovable on the screen.

While the control is repeated, the robot is drivingly controlled in such a manner that the points 6, 7 become overlapped on the screen to satisfy the relation of p=q. Specifically, the robot is controlled to move in the direction to cause the distal end 6 of the wire 5 to overlap the predetermined part (target point) 7 of the workpiece 30, so that the wire end approaches the target point 7. The operator can monitor the distal end 6 of the end effector approaching the target point 7, and can stop the robot motion by releasing the depressed approach key 22 when the end effector's distal end 6 sufficiently approaches the target point 7. Remaining fine adjustment can be made by means of ordinary jog feed.

To stop the robot, the processing may of course be completed when the absolute value of v(x, y) calculated at Step S3 nearly converges to zero (which can for example be determined by comparing the absolute value with a small positive value ε). In this case, however, there is a possibility that a deviation remains between the points 6, 7 in three dimensional space. In order to coincide these points 6, 7 in three dimensional space, supplementary jog feed may be made to eliminate such deviation.

Alternatively, the stop timing of the robot may be determined utilizing results of monitoring by means of a distance sensor (or a contact sensor). In this case, the distance or the presence/absence of contact may be determined once in each processing cycle to positively prevent interference from occurring by outputting a robot stop command or by generating an alarm indication on the screen 21 or by utilizing a buzzer function, when the distance becomes equal to or smaller than a reference distance value or when the presence of contact is determined. The function of the contact sensor may be achieved by the wire 5 per se. In this case, a low voltage may be applied to the wire 5, so that a circuit in a welding power source (not shown) operates in response to a voltage change generated when the distal end 6 of the wire 5 is in contact with the workpiece (metal) 30.

In addition, when the operator depresses the retreat key, the robot 1 starts to operate so that the distal end (first part) 6 of the wire 5 moves away from the target point (second part) 7. This operation is achieved by adding a vector (0, 0, −c) instead of adding the vector (0, 0, c) at Step G2 in the flowchart of FIG. 3 showing the approach operation.

Figure 4:
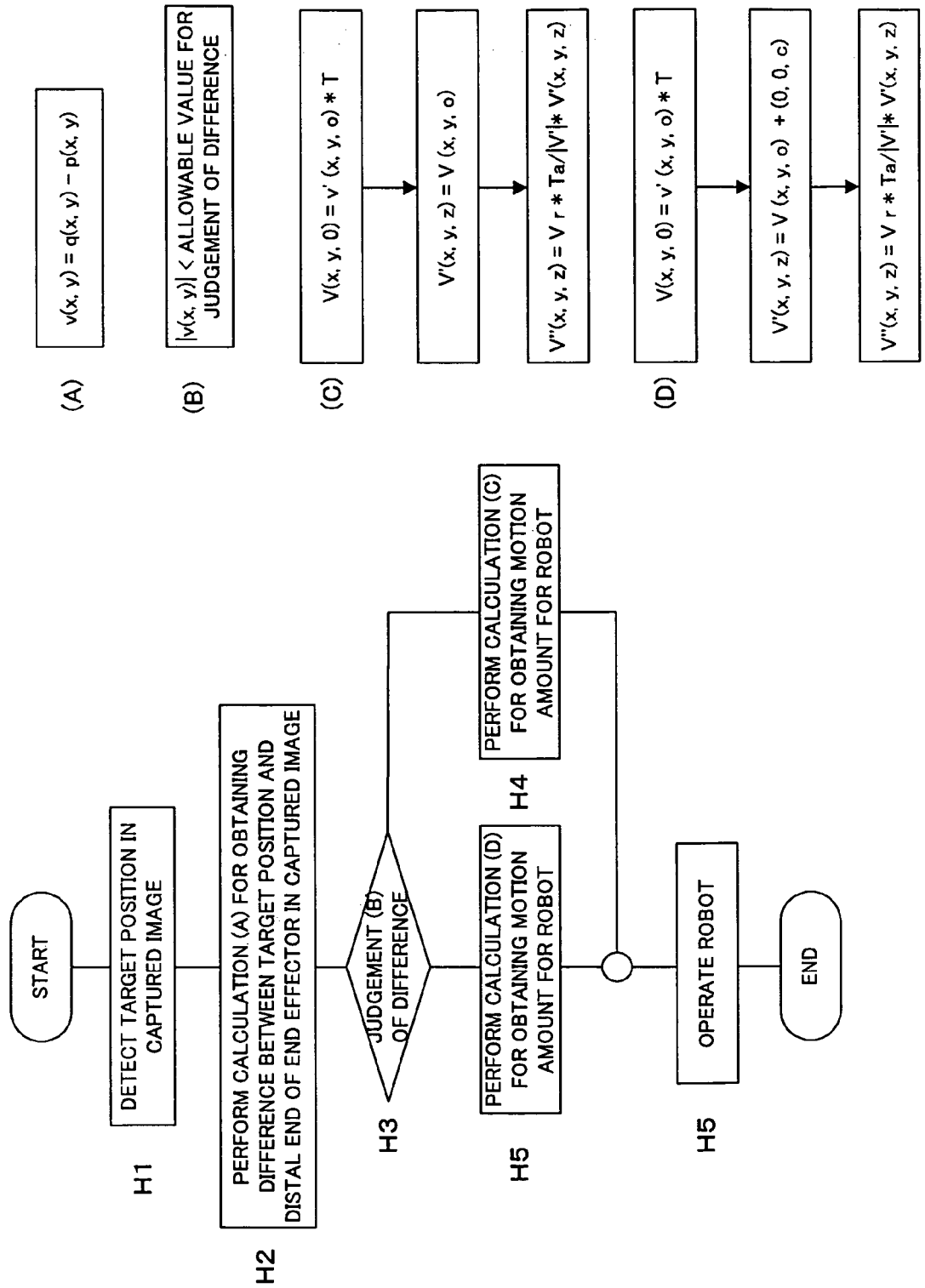
FIG. 4 is a flowchart for explaining the outline of another example of the control for approach operation.

Alternatively, the wire end may first be moved to close to the target point on the image without making a positive motion toward the optical axis. Thereafter, an actual motion to the target point in three dimensional space may be made utilizing the visual sensor. In this case, the addition of the vector (0, 0, c) at Step S3 is performed after the absolute value (norm) of the vector v(x, y) falls within a preset allowable value for error determination. Processing therefore is shown in the flowchart of FIG. 4. The following are main points of respective steps.

The following description will be made on a case of the approach operation. When the retreat operation is to be performed, such operation is achieved by adding a vector (0, 0, −c) instead of adding the vector (0, 0, c) in Step L2 in the flowchart of FIG. 4.

Step H1: The visual sensor detects a target position (a coordinate value q of the target point 7) on the image. This detection is performed in the same manner as mentioned above.

Step H2: A difference between the target position and a position of the distal end of the end effector on the image is calculated according to formula shown in (A) of FIG. 4, to determine an absolute value (norm) of a vector v(x, y) connecting a coordinate value q of the target position on the image and a coordinate value p of the distal end 6 of the wire 5 on the image. The absolute value serves as an error index representing the magnitude of deviation between the points 6, 7 (coordinate values p, q) on the screen.

Step H3: Using the error index determined at Step H2, a check is made whether or not an error falls within an allowable range in accordance with formula shown in (B) of FIG. 4. If the error is not within the allowable range, the flow advances to Step H4. If the error falls within the allowable range, the flow advances to Step H5.

Step H4: In order to prepare a motion command to make the points 6, 7 coincide with each other on the image, an amount of robot motion is calculated in accordance with calculation procedures of Steps K1-K3 shown in (C) of FIG. 4 (calculation 1 of motion amount). When comparing Steps K1-K3 with Steps G1-G3 in Step S3, it is understood that Step K1 is the same as Step G1, but Step K2 differs from Step G2 in that the addition of the vector (0, 0, c) is not made. Step K3 is the same as Step G3 in appearance but differs therefrom in that different formula (Step K2) is used for the calculation of vector V'. As distinct from Step S3, therefore, Step H4 does not include the procedure to always ensure a predetermined amount of motion in the optical axis direction as long as a sufficient approach on the image is not achieved.

Step H5: In order to prepare a motion command used after coincidence is formed between the points 6, 7 on the image, an amount of robot motion is calculated according to procedures of Steps L1-L3 shown in (D) of FIG. 4 (calculation 2 of motion amount). Steps L1-L3 are the same as the aforementioned Steps G1-G3 in Step S3. As explained previously, since the image only offers two dimensional information, the vector V(x, y, z) is represented by V(x, y, 0) lying in a plane perpendicular to the optical axis of the visual sensor. The coordinate transformation is performed to the vector v'(x, y, 0) obtained by three dimensionally extending the vector v(x, y), rather than to the vector v(x, y). Used for the coordinate transformation is the transformation matrix T which is the same as the one used in Step S3.

Step H6: A motion command is prepared for moving the robot from its current position by an amount (three dimensional vector quantity) represented by the vector V"(x, y, z) calculated at Step H4 or H5, and respective axis servomotors are controlled to move the robot. When the robot-completes its one period motion, the flow returns to Step H1 to repeat the aforesaid control.

Also in this case, the image displayed on the screen 21 is renewed at intervals of the motion cycle. Therefore, after start of the robot motion, the target point 7 moves in the image. (The distal end point 6 of the end effector is kept immovable on the screen.)

While the control is repeated, the points 6, 7 become overlapped on the screen, and subsequently, the robot is drivingly controlled in the direction to cause the distal end 6 of the wire 5 to overlap the predetermined part (target point) 7 of the workpiece 30 in three dimensional space, so that the wire end approaches the target point 7 in three dimensional space.

Also in this case, the operator can monitor the distal end 6 of the end effector approaching the target point 7, and can stop the robot motion by releasing the depressed approach key 22 when the end effector's distal end 6 sufficiently approaches the target point 7. Remaining fine adjustment can be made by means of ordinary jog feed.

The stop timing of the robot may be determined utilizing results of monitoring by means of a distance sensor (or a contact sensor). In this case, the distance or the presence/absence of contact may be determined once in each processing cycle to positively prevent the interference from occurring, by outputting a robot stop command or by generating an alarm indication on the screen 21 or by utilizing a buzzer function, when the distance becomes equal to or smaller than a reference distance value or when the presence of contact is determined.

The function of the contact sensor may be achieved by the wire 5 per se. In this case, a low voltage may be applied to the wire 5, so that a circuit in a welding power source (not shown) operates in response to a voltage change generated when the distal end 6 of the wire 5 is in contact with the workpiece (made of metal) 30.

Alternatively, after operating the robot so that the distal end of the wire approaches the target point in the captured image, during the operation of the robot so that the distal end of the wire approaches/retreats to/from the target point in the three-dimensional space using the visual sensor, the operation of the robot may be switched to a simpler operation of approaching/retreating to/from the target point. This can be achieved by replacing the vector v(x, y) calculated at Step H2 with zero vector (0, 0) at every processing period in the flowchart of FIG. 4.

In the above examples, a stepwise motion in the direction of the optical axis of the visual sensor is utilized to cause the end effector to approach (refer to Step S3 in FIG. 3 and Step H5 in FIG. 4). This is merely intended to give an example, and other modes may be adopted. For instance, a stepwise motion in the direction of view line of the visual sensor (camera) may be utilized. In this case, a vector representing the direction of the view line may be used instead of the vector (0, 0, c) representing an amount of operation in the optical axis direction.

Figure 5:
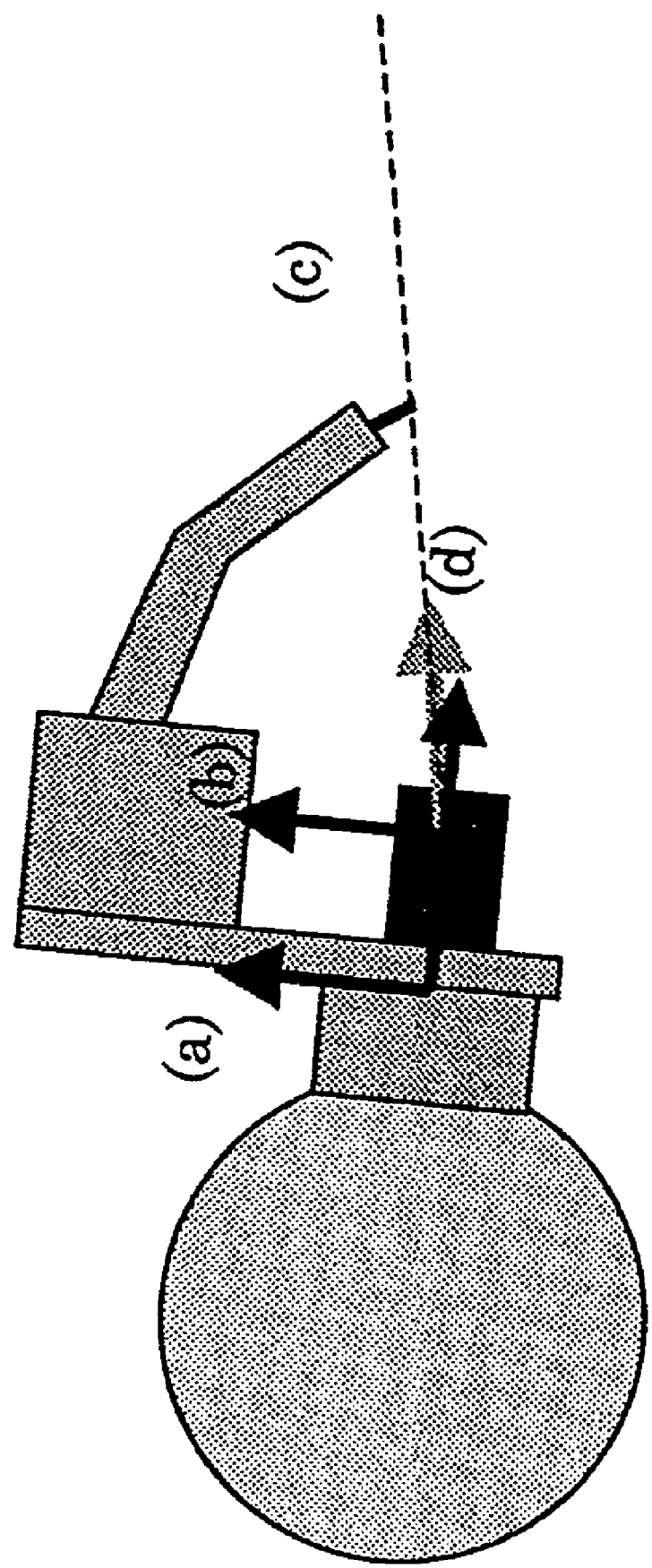
FIG. 5 is a view for explaining a vector extending in the direction of view line.

FIG. 5 explains the vector extending in the direction of view line. In FIG. 5, the view line is indicated by dotted line denoted by symbol (c), and a view line vector (d) passes positions of the focus of the visual sensor and the wire end that are represented by the robot flange coordinate system (a).

The view line vector (d) can be decomposed into components (a, b, c') corresponding to the components of the vector V(x, y, z) shown at Steps S3 and H5.

By performing the processing of concerned steps by using the vector (a, b, c'), instead of the vector (0, 0, c), in the formula in Step G2 in Step S3 or in Step L2 in Step H5, approach along the view line of the visual sensor can be achieved instead of approach along the optical axis of the visual sensor.

There is still another control mode in which none of the vectors extending in the directions of optical axis and view line is added to the motion command, making it possible to perform a. motion only on a two-dimensional coordinate system as seen from the visual sensor. In order to avoid the interference between the robot and the workpiece, a motion toward the target point is sometimes undesirable when the robot is near the target point. In such a case, this control mode is useful, which can be achieved by not adding the vector (0, 0, c) at Step S3.

The above control mode can also be applied to a case where the tool end point is present at one point in space, if the coordinate value of the one point on the screen 21 is preset.

There is another control mode to achieve a motion only on a two-dimensional coordinate system as seen from the visual sensor. For instance, irrespective of whether the predetermined part (first part) of the end effector 2 is displayed on the screen 21, the robot can be moved such as to cause the position of the predetermined part (second part) of the object 30 on the image to move in a specified direction. This can be realized by setting, as p(x, y), a certain point specified on the screen 21 by the operator.

Alternatively, irrespective of whether the predetermined part (first or second part) of the end effector 2 or the object 30 is displayed on the screen 21, the robot can be moved to move the field of view of the camera 3 in a specified direction. This can be realized by setting a certain point specified on the screen 21 by the operator and the center of the screen 21 as q(x, y) and p(x, y), respectively.

In these cases where the motion is performed only on the two-dimensional coordinate system as seen from the visual sensor, a predetermined coordinate system or a coordinate system set on the camera 3 is used as a reference coordinate system for robot motion. For example, in the case of using a predetermined coordinate system whose XY plane is a plane on which the robot is placed, the robot motion is restricted in a plane parallel to the XY plane. On the other hand, in the case of using a coordinate system set on the camera 3, the robot motion is restricted in a plane parallel to a plane perpendicular to the optical axis of the camera 3.

When the end effector's distal end (wire end) 6 is made coincide with the target point 7 with required accuracy by utilizing any one of the aforesaid control modes, the operator depresses a teaching key on the teaching pendant 20 to teach the robot this point (current robot position) as teaching point.

Next, the operator depresses the retreat key 23 to move the end effector 5 away from the target point 7. Processing therefore may be carried out variously. For example, in the preparatory work, a position at which the object 30 is seen in the field of view is stored. At the time of the retreat key 23 being depressed, the robot may be linearly moved using the stored position as a target retraction point.

When the next target point is seen in the camera image, such point is specified as a new target point in a manner as explained above. Then, the robot is moved again, and teaching is made. If the target point is considerably apart from the robot retraction position, the operator indicates on the screen 21 the direction (by tracing the direction on the touch panel) to which the operator desires to move the robot, whereby the motion is performed only on a two-dimensional coordinate system as seen from the visual sensor.

Figure 6:
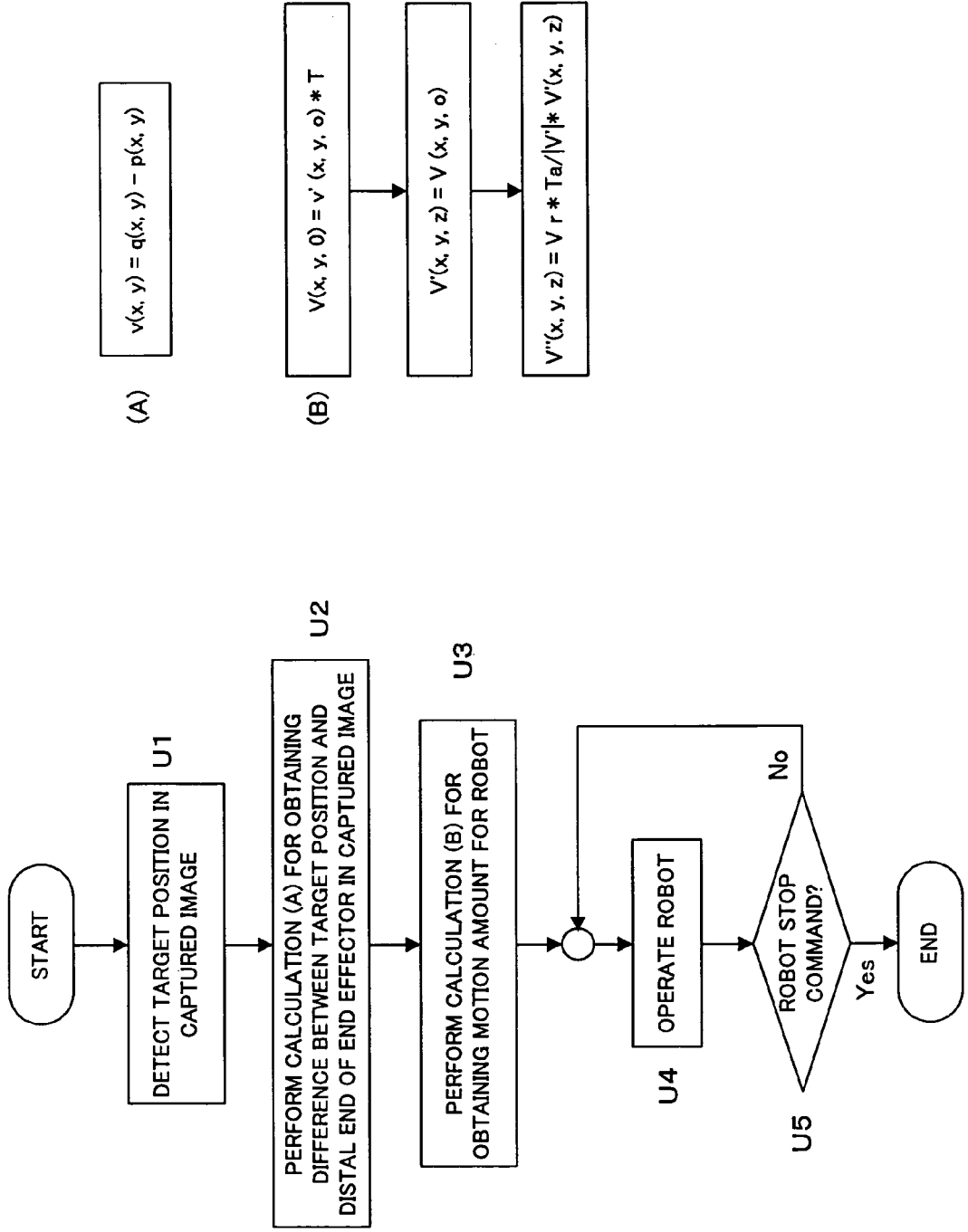
FIG. 6 is a flowchart for explaining the outline of a further example of the control for approach operation.

The above can easily be realized by continuing the motion command process at Step H4 until the robot stop command is input, as shown in the flowchart of FIG. 6.

In the flowchart of FIG. 6, Steps U1-U4 are processing steps that are the same as Steps H1, H2, H4, and H6, respectively (detailed explanations are not repeated here).

Step U5 is a step to check whether the robot stop command is input. Until an emergency stop key on the teaching pendant 20 is depressed by the operator, it is determined that the robot stop command is not input, and the robot continues to move. While watching the screen 21, the operator can determine the timing of depressing the emergency stop key, and can depress this key for example when the distal end 6 of the end effector sufficiently approaches the target point 7 on the screen 21.

In the embodiments, explanations have been given for the case of arc welding application, solely as illustrative purpose. It is apparent that this invention is also applicable to other applications, in which an end effector suited to the application concerned may be operated in the same manner as explained above. As for the image processing and display sections of the visual sensor, the teaching pendant is used in the embodiments for illustrative purpose only. Instead, a personal computer and its display may be used, for instance. In that case, the approach and retreat keys may be provided on the keyboard of the personal computer.

According to this invention, a portion of the robot end effector can easily be moved to close to that portion of the object which is recognized on the display screen. Thus, it is possible to carry out operations, such as teaching operation, to cause a predetermined part of the end effector to move to close to, to reach, and, conversely, to move away from a predetermined part of the object, without putting a heavy load on the operator. It is further possible to give instructions, on the screen, to operate the image capturing means attached to the. robot such that the aimed object falls within the field of view of the image capturing means. With these advantages, the teaching operation can be performed in a shortened period of time with ease. It is also possible to reduce the possibility of contact with the end effector, workpiece, jig, peripheral device, etc., which would otherwise be caused by mistake in the teaching operation.

What is claimed is:

1. A robot system comprising:
   a robot with an end effector mounted thereon;
   a visual sensor having image capturing means for capturing an image including a first point set with respect to the end effector and a second point set with respect to an object;
   approach commanding means for issuing an approach command for operating the robot such that the first point approaches the second point in three dimensional space in response to input of an approach instruction;
   means for recognizing positions of the first and second points in the image captured by said visual sensor with the first and second points being within a field of view of the image capturing means to obtain a positional relation between the first point and the second point in the image;
   means for calculating a first motion command for operating the robot such that the first point and the second point approaches each other in the captured image based on the positional relation between the first point and the second point in the image;
   means for calculating a second motion command for operating the robot such that the first point approaches the second point in the three dimensional space in response to the approach command;
   means for obtaining a first combined motion command by combining the first motion command and the second motion command, to operate the robot according to the first combined motion command; and
   means for repeating the recognition of the positional relation between the first point and the second point, the calculations of the first motion command and the second motion command and the robot operation according to the first combined motion command while the approach instruction is inputted to said approach commanding means.

2. A robot system according to claim 1, wherein said first point is set by designating a picture element in the captured image irrespective of whether the end effector is within the field of view of said image capturing means, and the robot system comprises means for making said image capturing means approach a position of the second point the object as the first point and the second point approach each other in the captured image.

3. A robot system according to claim 1, further comprising:
   means for operating the robot according to the first motion command;
   means for determining whether or not the positional relation between the first point and the second point in the captured image fulfills a predetermined condition; and
   means for repeating the recognition of the positional relation between the first point and the second point, the determination by said determination means, the calculation of the first motion command, and the operation of the robot according to the first motion command until said determination means determines that the predetermined condition is fulfilled, in response to the input of the approach instruction to said approach commanding means, before repeating the operation of the robot according to the first combined motion command.

4. A robot system according to claim 3, further comprising:
   means for repeating the operation of the robot according to the second motion command after repeating the operation of the robot according to the first combined motion command.

5. A robot system according to claim 1, wherein said means for calculating the second motion command calculates motion information for moving the end effector in a direction along an optical axis of the image capturing means.

6. A robot system according to claim 1, wherein said means for calculating the second motion command calculates motion information for moving the end effector in a direction along a line of sight connecting the image capturing means and the second point.

7. A robot system according to claim 1, further comprising:
   a distance sensor or a contact sensor mounted on the robot; and
   means for stopping the robot when said distance sensor or said contact sensor detects that the first point approaches the second point within a predetermined distance while the approach instruction is inputted to said approach commanding means.

8. A robot system according to claim 7, wherein a position at which the robot stops is stored as a taught position.

9. A robot system according to claim 1, further comprising:
   retreat commanding means for issuing a retreat command for operating the robot such that the first point moves remote from the second point in three dimensional space in response to input of a retreat instruction;
   means for calculating a third motion command to operate the robot such that the first point moves remote from the second point in three dimensional space in response to the retreat command;
   means for obtaining a second combined motion command by combining the first motion command and the third motion command, to operate the robot according to the second combined motion command; and
   means for repeating the recognition of the positional relation between the first point and the second point, the calculations of the first and third motion commands, and the operation of said robot according to the second combined motion command while the retreat instruction is inputted to said retreat commanding means.

10. A robot system according to claim 9, further comprising:
    means for operating the robot according to the first motion command;
    determination means for determining whether or not the positional relation between the first point and the second point in the captured image fulfills a predetermined condition; and
    means for repeating the recognition of the positional relation between the first point and the second point, the determination by said determination means, the calculation of the first motion command and the operation of the robot according to the first motion command until said determination means determines that the predetermined condition is fulfilled, in response to the input of the retreat instruction to said retreat commanding means before repeating the operation of the robot according to the second combined motion command.

11. A robot system according to claim 10, further comprising:
    means for repeating an operation of the robot according to the third motion command after the operation of the robot according to the second combined motion command.

12. A robot system according to claim 9, wherein said means for calculating the third motion command calculates motion information for moving the end effector in a direction along an optical axis of the image capturing means.

13. A robot system according to claim 9, wherein said means for calculating the third motion command calculates motion information for moving the end effector in a direction along a line of sight connecting the image capturing means and the second point.

14. A robot system according to claim 1, further comprising display means for displaying the image captured by the image capturing means of said visual sensor,
wherein a line segment connecting the first part and the second part is displayed on the captured image by said display means.

15. A robot system according to claim 1, wherein the image capturing means is mounted on the robot.

16. A robot system comprising:
a robot with an end effector mounted thereon;
a visual sensor having image capturing means for capturing an image including a first point set with respect to the end effector and a second point set with respect to an object;
visually two-dimensional approach commanding means for issuing a visually two-dimensional approach command for operating the robot such that the first point and the second point approach each other two-dimensionally in the captured image in response to input of a visually two-dimensional approach instruction;
means for recognizing positions of the first point and the second point in the image captured by said visual sensor with the first and second points being within a field of view of said image capturing means to obtain a positional relation between the first point and the second point in the image;
means for calculating a motion command for operating the robot such that the first point and the second point approach each other in the captured image based on the positional relation between the first point and the second point;
means for operating the robot according to the calculated motion command; and
means for repeating the recognition of the positional relation between the first point and the second point, the calculation of the motion command, and the operation of the robot according to the obtained motion command while the visually two-dimensional approach instruction is inputted to said visually two-dimensional approach commanding means.

17. A robot system according to claim 16, wherein said first point is set by designating a picture element in the captured image irrespective of whether the end effector is within the field of view of said image capturing means, and the robot system comprises means for making said image capturing means approach a position of the second point the object as the first point and the second point approach each other in the captured image.

18. A robot system comprising:
a robot with an end effector mounted thereon;
a visual sensor having image capturing means for capturing an image including a first point set with respect to the end effector and a second point set with respect to an object;
visually two-dimensional approach commanding means for issuing a visually two-dimensional approach command for operating the robot such that the first point and the second point approach each other two-dimensionally in the captured image in response to input of a visually two-dimensional approach instruction;
means for specifying a direction of visually two-dimensional motion of the first point in the image captured by said visual sensor with the first point and the second point within a field of view of the image capturing means;
calculation means for calculating a motion command for operating the robot such that the first point moves in the specified direction; and
means for operating the robot according to the calculated motion command.

* * * * *

UNITED STATES PATENT AND TRADEMARK OFFICE
CERTIFICATE OF CORRECTION

PATENT NO. : 7,424,341 B2
APPLICATION NO. : 10/853169
DATED : September 9, 2008
INVENTOR(S) : Atsushi Watanabe et al.

It is certified that error appears in the above-identified patent and that said Letters Patent is hereby corrected as shown below:

Column 2, Line 5, change "fictions" to --functions--.

Column 6, Line 24, change "certain.direction" to --certain direction--.

Column 7, Line 26, change "Workpiece" to --workpiece--.

Column 10, Line 24, change "robot-completes" to --robot completes--.

Column 12, Line 61, change "the. robot" to --the robot--.

Signed and Sealed this

Ninth Day of December, 2008

JON W. DUDAS
*Director of the United States Patent and Trademark Office*